Aug. 17, 1943.　　W. H. BUCKNELL　　2,327,168
CONCEALMENT DEVICE
Filed Feb. 7, 1941　　2 Sheets-Sheet 1
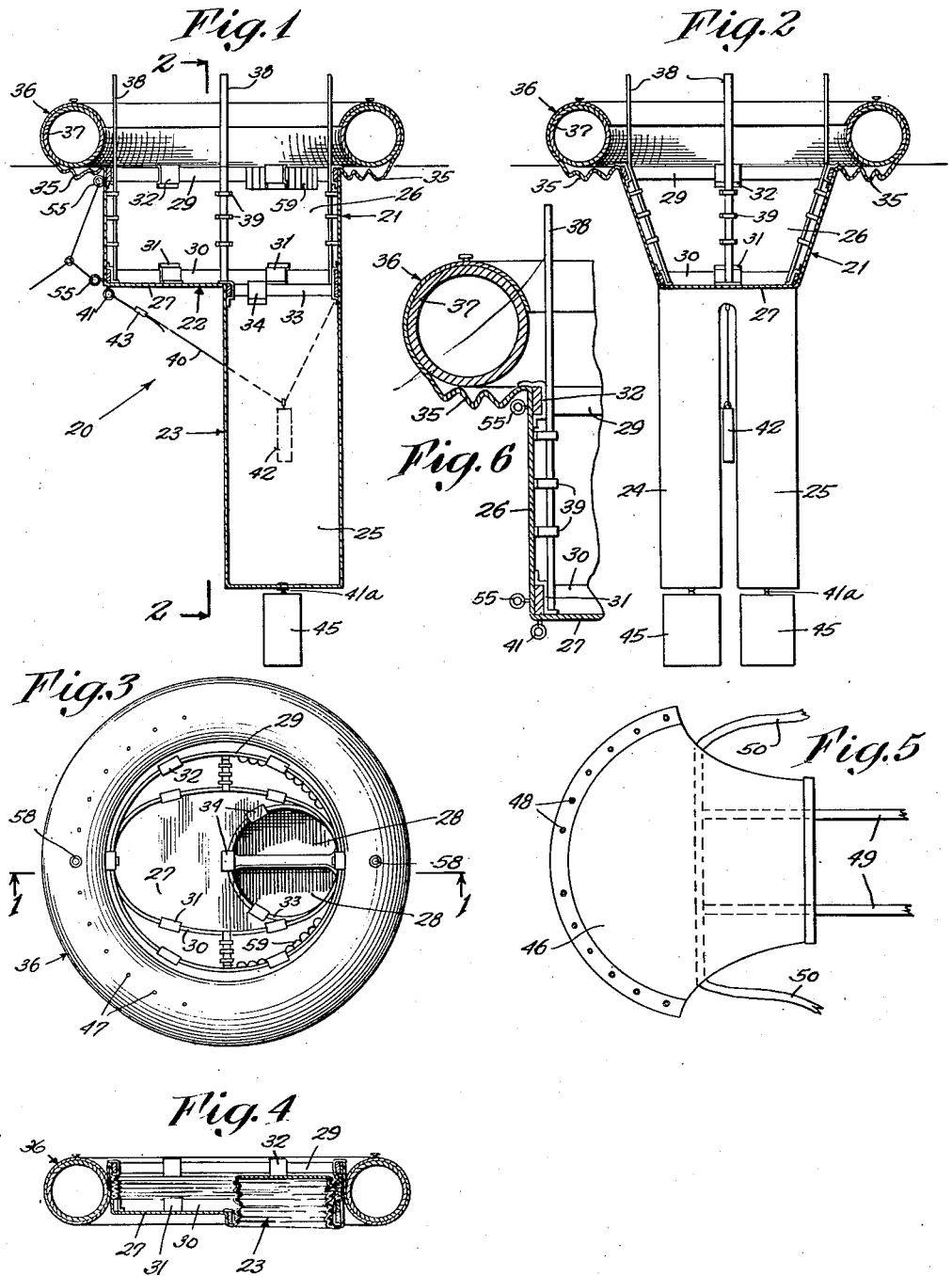
INVENTOR
William Harlan Bucknell
BY Feyrer and Mack
ATTORNEYS Aug. 17, 1943.　　　W. H. BUCKNELL　　　2,327,168
CONCEALMENT DEVICE
Filed Feb. 7, 1941　　　2 Sheets-Sheet 2

INVENTOR
William Harlan Bucknell
BY Feyrer and Mack
ATTORNEYS

Patented Aug. 17, 1943

2,327,168

UNITED STATES PATENT OFFICE 2,327,168

CONCEALMENT DEVICE

William Harlan Bucknell, Norwalk, Conn., assignor of one-half to Anita R. Bucknell, Norwalk, Conn.

Application February 7, 1941, Serial No. 377,783

15 Claims. (Cl. 9—5)

This invention relates to a concealment device.

It is an object of the invention to provide a concealment device which is particularly adapted for use in water, but which also may be used effectively on land.

Another object of the invention is to provide a concealment device which will keep the occupant dry even in rough water and at the same time will present a minimum area exposed above the water surface.

Another object of the invention is to provide a concealment device which is adaptable for use in water of divers depths.

Other objects of the invention are to provide a device which may be economically manufactured, which may be readily carried from place to place on land or easily moved in water, and which is particularly effective as a concealment device.

Another object of the invention is to provide a concealment device, particularly adapted for use in water, and which is especially stable and safe and at the same time presents a minimum area exposed above the surface of the water.

A feature of the invention, therefore, resides in the provision of a concealment device with a flexible and collapsible main body in which a hunter or other individual requiring concealment may locate himself, the main body being adapted to alone support the hunter and his equipment in water with only a relatively small area of the body exposed above the water surface, and the main body having associated with the upper portion thereof an encircling water-excluding section of flexible material carried by a float and concealing means which is adapted to rise and fall with uneven water at the surface independently of the main body.

Another feature of the invention resides in the provision of a concealment device of the above character, including special means serving together with the main body, float means and flexible section, to most effectively camouflage and conceal an individual in the device.

Other objects and features will hereinafter appear.

In the drawings:

Figure 1 is a sectional view taken on the line 1—1 of Fig. 3.

Fig. 2 is a sectional view taken on the line 2—2 of Fig. 1.

Fig. 3 is a top view of the device shown in Figs. 1 and 2.

Fig. 4 is a view showing the device in collapsed position.

Fig. 5 is a detail view of the spray and concealing hood.

Fig. 6 is an enlarged fragmentary sectional detail view of a portion of the device as shown in Fig. 1.

Figure 7:
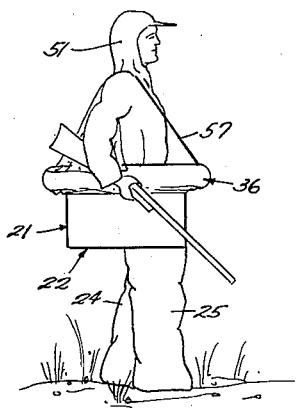
Figs. 7, 8, 9, 10, 11 and 12 are views illustrating the device in actual use.

Before describing the present improvements and mode of operation thereof in detail it should be understood that the invention is not limited to the details of construction and arrangement of parts shown in the accompanying drawings, which are merely illustrative of the present preferred embodiments, since the invention is capable of other embodiments, and the phraseology employed is for the purpose of description and not of limitation.

Referring more particularly to the drawings, there is shown a device 20 involving an especially advantageous embodiment of the present invention, including a collapsible body 21, especially adapted to receive a hunter or other individual requiring concealment, and comprising a seating section 22 and a connected leg-receiving section 23, the latter section preferably comprising a pair of leg-receiving extensions 24 and 25 facilitating movement of the hunter on land or in water.

As shown the body 21, which is baglike in general construction, is advantageously formed of a suitable flexible waterproof material, as rubberized fabric or waterproofed canvas. The seating section 22 thereof includes side walls 26 that extend upwardly from a bottom or seat portion 27 which may be and preferably is formed of the same flexible material as the side walls, but which may be formed of rigid material. The pair of leg-receiving extensions 24 and 25, preferably and as illustrated depend from a pair of openings 28 disposed forwardly in the seat portion 27. With this construction, it is thus seen that provision is made for an occupant, see Figs. 10 and 11, for example, to sit in a natural position and at the same time bend forward in the seating section 22 of the baglike body.

To maintain the flexible side walls 26 of the seating section against lateral collapsing, and to control the displacement thereof when in water, spreader means such as the rings 29 and 30 are provided at the normally open upper portion of the seating section and to encircle the lower portion of the seating section adjacent the bottom 27. Suitable loops 31 and 32 may be sewed or otherwise secured to the side walls of the seating section to locate the rings 29 and 30 and maintain the same in position. A supplemental spreader means, such as the ring 33, also preferably is provided to encircle the pair of openings 28 and thus reinforce and support the adjacent portions of the bottom. As in the case of the rings 29 and 30, suitable loops 34 sewed or otherwise secured to the baglike body 21 may be utilized to locate the spreader ring 33.

Of particular importance the baglike body 21 is so designed that when in a distended or noncollapsed condition, as in Figs. 1 and 2, the seating section 22 will displace only slightly more than sufficient water to support the weight of an average individual and his equipment. Thus when the device 20 is used in water, the upper portion of the baglike body 21 is level or substantially level with the water surface and the remaining portions of the body are wholly submerged.

Figure 10:
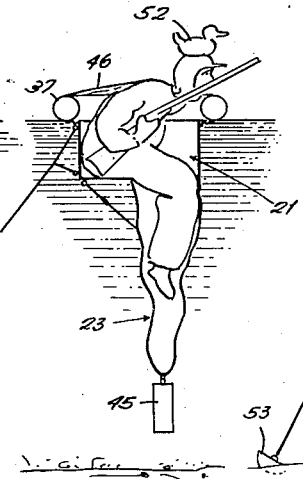
Figure 11:
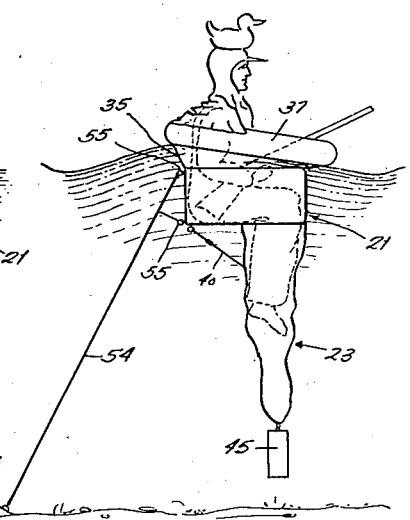

In computing the displacement of the body 21 to bring about the above-described result, some consideration of course must be given to the displacement of the leg-receiving extensions 24 and 25, which are of sufficient length and circumference to allow freedom of movement when either walking or sitting, as well as to the displacement of the seating section 22. However, because preferably and as shown, no spreaders are provided in the leg-receiving extensions, the flexible material thereof, as shown in Figs. 10 and 11 for example, will be forced inwardly by the pressure of the surrounding water and thus, when the occupant is in a sitting position, cause the extensions to displace only slightly more water than would the lower portions of the occupant's legs. Hence, in practice the bouyancy of the leg-receiving section 23 of the body 21 is reduced to a minimum.

Also of importance, there is provided an extensible section 35 of flexible waterproof material, at one end encircling and connected to the upper portion of the seating section of the baglike body 21, and at the other end connected to a float means 36 which preferably and as shown is in the form of a hollow ring or annulus 37 which if of rubber or the like may be inflated through any suitable and conventional valve as, for example, used with an ordinary inner tube for vehicle tires.

With this construction and as shown in Figs. 1, 2, and 10, for example, the upper portion of the body 21 is below the top of the float annulus and the flexible encircling section 35 normally is in a nonextended or collapsed condition, thus permitting the float annulus 37 to rock and move independently of the baglike body to an appreciable extent. This fact, as will be presently explained in detail, results in one of the very important advantages of the device 20.

Preferably, and as clearly shown in the drawings, a continuation of the extensible section 35 is provided to cover or substantially cover the entire outside of the float annulus.

Because the baglike body 21 is designed to alone support an occupant and his equipment in water, it is not absolutely essential that the float annulus be capable of supporting any more than the weight of the extensible section 35. However, advantageously the float annulus, as a measure of stability and safety, may be and preferably is so proportioned that it is capable of supporting not only the flexible extension but also the entire baglike body with an occupant and his equipment therein even though the body be filled or substantially filled with water.

To prevent adverse lateral movement of the float annulus 37 relative to the seating section 22 of the body 21, while at the same time permitting appreciable free rising and falling of the annulus, there may be and preferably are provided ribs or struts 38 conveniently held removably in place by loops 39 on the side walls of the seating section 22 and extending upwardly therefrom within the float annulus as most clearly shown in Figs. 1 and 2.

In actual use, and in part because individuals of various weights and using equipment of various weights may employ the device 20, there is provided as a feature of the invention, means by which the total weight supported by the body 20 may be adjusted. Thus as shown in Figs. 1 and 2 a means, as the cord 40, secured to and adapted to extend downwardly from holding rings 41 adjacent the bottom 27 of the seating section 22, may be provided for detachably supporting a weight 42 between the leg-receiving extensions 24 and 25. Adjustment of the effective length of the cord 40 to control the vertical position of the weight 42 is permitted by a conventional wedge holding collar or tube 43 into which the ends of the cord may be inserted. Also, suitable means, such as the rings 41a may be provided for detachably supporting weights 45 from the lower extremities of each of the leg-receiving extensions 24 and 25. The size or poundage and the number of the weights 42 and 45, it will be appreciated, will be determined by the displacement of the body 21 and the weight of the regular load to be supported by the latter. By adjusting the weights 42 and 45 and/or by eliminating the weight 42 or the weight 45, the body of the device may be caused to set down in the advantageously low position in the water as shown in the drawings. Of importance, and in addition to the function of adjusting the total load supported by body 21 to maintain the latter almost entirely submerged, the weights 42 and 45 also serve as stabilizers for the device as well as preventing any tendency of the device to capsize due to the lift of the water displaced thereby, especially in rough water or when the weight of the individual in the device is shifted as, for example, when shooting a gun.

Cooperating with the weights in stabilizing the device is the float means 36 which is connected to the body 21 in such a way that it may move independently of and rock relative to the latter to an appreciate extent. Thus, should the individual in the device shift his weight, the float means resists any tendency of the device to overturn. Moreover, of special importance and as illustrated in Fig. 11, in rough water the float means will rise and fall in a rocking fashion freely with the waves, as there is no rigid connection to the body, and carry with it the flexible section 35 which will prevent water from flowing over the upper portion of the almost entirely submerged body 21 of the device.

The importance of the foregoing structural features is readily understandable, especially when it is borne in mind that they result in the provision of a device which presents a minimum area exposed above the surface of the water where it can be seen by birds or people from the air or from locations on the water or on the land, and which at the same time may be kept dry inside and is safe against total submersion such as might otherwise be caused by the capsizing or flooding.

Moreover, with the construction above described the individual using the same, may be completely or substantially completely concealed thereby. Preferably, and as shown in the drawings, to render the device particularly effective as a concealing means, there is provided a spray and concealing hood 46, see Figs. 5, 8, 9, 10, 11 and 12, which, as by separable fasteners 47 on the continuing portion of the flexible section 35 on the float annulus 37, and cooperating separable fasteners 48 on the rear portion of the spray hood, may be connected to the body of the device. Thus, when the spray hood 46 has been attached to the back of the occupant, as by straps 49 and 50 respectively adapted to pass over the shoulders and under the arms of the occupant and be tied or otherwise secured together in front, he may bend forward, see Fig. 10, to not only be substantially entirely concealed from the air but also to exclude from the interior of the baglike body 21 excessive spray or rain.

Additionally, and to further conceal and camouflage the occupant, there may be provided a head and neck covering hood 51, which may or may not be formed integral with the forward end of the spray hood 46 and to which there may be detachably secured by any suitable means, a decoy 52.

Preferably and to complete the concealment and camouflage features of the device, the exterior of the baglike body 21 and of the extensible section 35 including the annulus-covering continuing portion of the latter, may be colored or otherwise marked to simulate or blend with the surrounding area be it land or water.

In Figs. 7 through 12, the adaptability of the device 20 to various conditions of use, is illustrated. Thus in Figs. 10 and 11 the device is shown in use in deep water, in Fig. 11 the device having attached thereto a suitable anchor 53 by a line 54 secured at its upper end to a pair of holding rings 55 connected in any conventional manner at spaced points to the rear side of the baglike body. Also, in Fig. 11, the action of the float means 36 and the extensible section 35 in rising with a wave independently of the body 21 is illustrated. In Fig. 10 the substantially total concealment of the hunter, when he bends forward, is clearly shown. In the latter Fig. 10, as in Fig. 11, it is apparent that the body 21, the float annulus 36, the spray and concealment hood 46, the head and neck covering hood 51 and the decoy 52, all serve together to conceal and camouflage the hunter or other occupant using the device. Moreover, the uncramped and natural positions which may be assumed by a person using the device are shown by the illustrative figures in the drawings.

Figure 9:
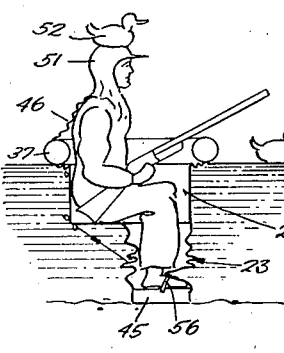

In Fig. 9, the adaptability of the device for use in relatively shallow water is illustrated. There it will be noted that the weights 45 on the lower portions of the leg-receiving extensions 24 and 25, may be secured thereto and to the feet of the occupant, as by straps 56 passing through apertures in the weights, in such a way that the weights do not swing freely as in Figs. 10 and 11. When used in shallow water, the weights 45 serve as anchors so that when the occupant sits down in the concealment device 20 the latter is completely ready for use and will not drift to some other location.

Figure 12:
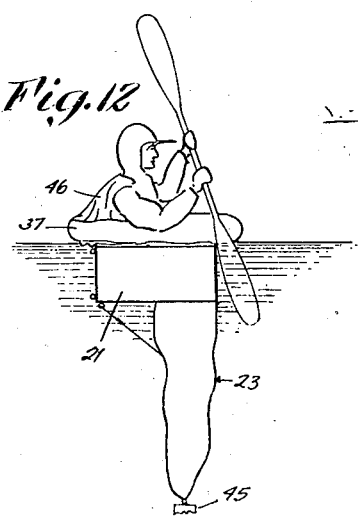

In Fig. 12, the adaptability of the device as a whole to be readily propelled, as by a paddle, from place to place in deep water is shown.

In Fig. 7, the ease with which an occupant may move from place to place on land or in very shallow water is illustrated, with straps 57, which may pass over the occupant's shoulders and be secured to suitable cleats 58 or the like at the forward and rear portions of the float annulus 37, serving to maintain the device 20 in distended or noncollapsed condition.

Figure 8:
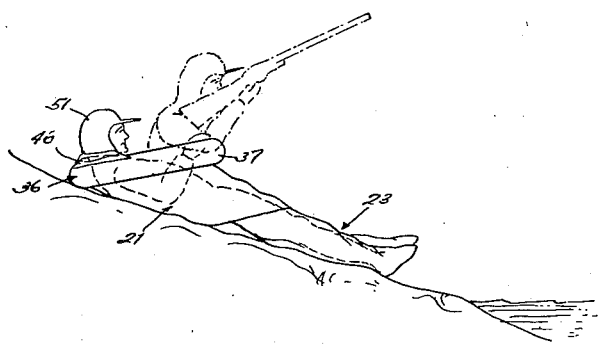

In Fig. 8 the adaptability of the device for concealment purposes on land is illustrated, the annulus 37 serving as a cushion as well as a concealment element when the occupant is in a reclining position, and the upper spreader ring 29 and the annulus 37 serving as a means for maintaining the upper portion of the device, especially the forward side thereof, in an up or effective concealing position when the occupant reclines therein. Moreover, if the shoulder straps 57 are used, a further means is provided for keeping the device as a whole in a most effective concealing relationship with respect to the occupant.

While in the foregoing description the device has been considered in its distended or substantially distended and operative conditions, one of the advantages of the device is the ease with which the same may be collapsed to the condition showed in Fig. 4, where it occupies a minimum of space when not in use and may be easily handled. Because of the flexible nature of the material constituting both the seating and leg-receiving sections of the body, the collapsing operation is obvious and substantially automatic. For example, assuming the device to be supported by shoulder straps on a man as shown in Fig. 7, to collapse the complete device to the condition shown in Fig. 4 it merely is necessary to release the straps and permit the device to fall downwardly by its own weight. To get into the device, a man need merely step into the same in its collapsed condition and pull it up to the position shown in Fig. 7.

From the foregoing it is readily apparent that the present invention provides a device which permits free movement of the occupant either in shooting position or when paddling, is safe and mobile in water, and is admirably adapted for concealment purposes either on land or in water of various depths.

A use for which the present device is particularly adapted is as a blind for a duck or other bird hunter. When so used, the hunter, by utilizing the duck decoy 52 on the head-covering hood and by assuming the position shown in Fig. 10 and turning his head, may create an illusion of a duck swimming on the surface of the water, especially if viewed from the air. Also, shell-holding pockets 59 may be provided with the body 20. However, while the device is particularly adapted for use as a concealment device or blind by hunters, it will be appreciated that it may have other uses.

Variations and modifications may be made within the scope of this invention and portions of the improvements may be used without others.

Having thus described the invention, what is claimed as new is:

1. A concealment device of the character described, including in combination, a baglike body of flexible material, having a seating section with side walls and a seat, and having a pair of leg-receiving extensions depending therefrom; spreader means in said seating section; a flexible water-excluding means encircling and connected to the upper portion of said body; and float means disposed around said body and rockable relative thereto, said flexible means being intermediate said body and said float means and serving to connect and to enable a spacing of the latter and said body, and said body being adapted to extend below said float means to alone support an occupant and his equipment in water, whereby said float means and the flexible water-excluding means are adapted to rockingly rise and fall with waves at the water surface independently of said body when the latter is supporting an ocupant in the water.

2. A concealment device of the character described, including in combination, a collapsible body having a seating section with side walls and a bottom seat, and having a pair of leg-receiving extensions depending therefrom forwardly of said bottom seat; spreader means adjacent the upper portion of said body; float means disposed around said body and rockable relative thereto; extensible water-excluding means carried by said float means and encircling and connected to the upper portion of said body, said body being adapted to alone support an occupant and his equipment in water with the upper portion of the body substantially level with the water surface.

3. A concealment device of the character described, including in combination, a baglike body of flexible material having a seating section with side walls and having a depending leg-receiving section, said body being designed to alone support an occupant and his equipment in water; spreader means adjacent the upper and lower portions of said seating section; a water-excluding section of flexible material encircling the upper portion of said seating section; float means for said water-excluding section, rockable relative to said body; and weight means on said body, cooperable with said float means and said water-excluding means in stabilizing said body.

4. A concealment device of the character described, including in combination, a baglike body of flexible material having a seating section with side walls and a bottom seat, and having a pair of leg-receiving extensions depending forwardly of said bottom seat; means for maintaining said body against lateral collapsing, said body being designed to alone support an occupant and his equipment in water; float means rockable relative to said body; flexible water-excluding means connecting and enabling a spacing of said body and said float means; concealing and spray hood means connected to the upper portion of said body rearwardly of said leg-receiving means; and means on said hood means for securing the same to the occupant.

5. A device of the character described, including in combination, a body; float means disposed about and rockable relative to said body; and a flexible waterproof section encircling, extending from and connected to said body and connected to said float means, said body extending downwardly from said flexible section and being adapted to support an occupant and his equipment in water independently of said float means, whereby said float means is adapted to rockably raise and lower said flexible section with uneven water at the surface independently of said body.

6. A device of the character described, including in combination, a body of flexible waterproof material; spreader means associated with said body; and a float ring encircling and connected to the upper portion of said body for rocking movement relative thereto; flexible water-excluding means intermediate said float ring and the upper portion of said body and providing the connection between the latter and said float ring, said body being designed to support an occupant and his equipment in water independently of said float ring with said upper portion substantially level with the surface of the water, whereby an occupant may conceal himself in said body-receiving portion which is substantially submerged, and behind said float ring.

7. A device of the character described, including in combination, a body of flexible material; spreader means associated with said body; float means connected to the upper portion of said body for rocking movement relative thereto; flexible water-excluding means intermediate said float means and the upper portion of said body and providing the connection between the latter and said float means, said body being designed to support an occupant and his equipment in water independently of said float means; and hood means adapted to be secured to the back of the occupant, and with said float means substantially entirely conceal the occupant in the body which is substantially submerged, when the occupant bends forward.

8. A device of the character described, including in combination, a collapsible body; float means rockable relative to said body; and means intermediate said float means and the upper portion of said body and encircling the latter, connected to said body and said float means and adapted to enable a spacing of the float means and body all of the way around the latter, designed to exclude water from said body and to permit rocking movement of said float means independently of said body.

9. A device of the character described, including in combination, a baglike body of flexible material; float means rockable relative to said body; means intermediate said float means and the upper portion of said body and encircling the latter, connected to said body and said float means and adapted to enable a spacing of the float means and body all of the way around the latter, and designed to exclude water from said body and to permit rocking upward and downward movement of said float means with the surface of the water independently of said body; and means for limiting lateral movement of said float means relative to said body-receiving portion.

10. A device of the character described, including in combination, a baglike body having a seating section and a leg-receiving section, said body being formed of flexible material; float means rockable relative to said body; and flexible water-excluding means carried by said float means and connected to said body enabling a rocking movement of the latter independently of said body, said body being adapted to support an occupant in water independently of said float means.

11. A concealment device of the character described, including a body of flexible material having a seating section with side walls, and having a pair of leg-receiving extensions depending therefrom; spreader means for said side walls; float means; flexible water-excluding means providing the only connection between the upper portion of said body and said float means, said body being adapted to support an occupant in water independently of said float means, and said float means having a portion adapted to extend upwardly relative to said water-excluding means; and means for limiting lateral movement of said float means relative to said body.

12. A concealment device of the character described, including a body of flexible material having a seating section with side walls, and having a pair of leg-receiving extensions; spreader means for said side walls; float means disposed around the upper portion of said body and rockable relative thereto; a section of flexible material providing the only connection between the upper portion of said body with said float means, permitting upward and downward movement of said float means independently of said body; and attaching means connected to said body and adapted to be associated in supported relation with respect to an individual using the device, for attaching said device to said individual.

13. A concealment device of the character described, including a body of flexible material having a seating section with side walls, and having a pair of leg-receiving extensions; float means disposed around the upper portion of said body and rockable relative thereto; a section of flexible material connecting the upper portion of said body with said float means, permitting a rocking upward and downward movement of said float means independently of said body; a spray and concealing hood adapted to cover the back of an occupant of the device; detachable means for securing said hood to said body; and a head covering having a decoy thereon, said head covering and decoy together with said concealing hood and said float means, serving to camouflage and conceal an individual in said body.

14. A concealment device of the character described, including a body having a seating section with collapsible side walls and having a pair of leg-receiving extensions of flexible material; spreader means for maintaining said side walls against lateral collapsing; float means disposed around the upper portion of said body; a section of flexible material encircling the upper portion of said body, providing the only connection between the latter and said float means, permitting rocking upward and downward movement of said float means and said flexible section independently of said body; and weight means associated with the lower portions of said leg-receiving extensions, cooperable with said float means and said section of flexible material in stabilizing said body, said body being adapted to support an occupant in water independently of said float means.

15. A concealment device of the character described, including a body having a seating section with collapsible side walls and having a pair of leg-receiving extensions of flexible material; spreader means for maintaining said side walls against lateral collapsing; float means disposed around the upper portion of said body and rockable relative thereto; a section of flexible material encircling the upper portion of said body and connected to said float means, permitting rocking upward and downward movement of said float means and said flexible section independently of said body; and weight means secured to the lower portion of said seating section, cooperable with said float means and said section of flexible material in stabilizing said body, said body being adapted to support an ocupant in water independently of said float means.

WILLIAM HARLAN BUCKNELL.